(12) United States Patent
Burek et al.

(10) Patent No.: US 10,281,648 B2
(45) Date of Patent: May 7, 2019

(54) DEVICE SUPPORT STRUCTURES FROM BULK SUBSTRATES

(71) Applicant: President and Fellows of Harvard College, Cambridge, MA (US)

(72) Inventors: Michael J. Burek, Somerville, MA (US); Marko Loncar, Cambridge, MA (US)

(73) Assignee: PRESIDENT AND FELLOWS OF HARVARD COLLEGE, Cambridge, MA (US)

( * ) Notice: Subject to any disclaimer, the term of this patent is extended or adjusted under 35 U.S.C. 154(b) by 344 days.

(21) Appl. No.: 13/954,108

(22) Filed: Jul. 30, 2013

(65) Prior Publication Data

US 2015/0036975 A1    Feb. 5, 2015

(51) Int. Cl.
*G02B 6/13* (2006.01)
*G02B 6/136* (2006.01)
*G02B 6/122* (2006.01)
*G02B 6/12* (2006.01)

(52) U.S. Cl.
CPC .......... *G02B 6/136* (2013.01); *G02B 6/1223* (2013.01); *G02B 2006/1204* (2013.01); *G02B 2006/12078* (2013.01); *G02B 2006/12107* (2013.01); *G02B 2006/12173* (2013.01); *Y10T 428/24479* (2015.01)

(58) Field of Classification Search
CPC .. G02B 2006/12173; G02B 2006/1176; G02B 6/02295; G02B 6/02314; G02B 6/136
USPC ......... 385/31, 130; 216/24; 428/156; 438/31
See application file for complete search history.

(56) References Cited

U.S. PATENT DOCUMENTS

| | | | |
|---|---|---|---|
| 5,439,782 A | 8/1995 | Haemmerle et al. | |
| 5,581,642 A * | 12/1996 | Deacon | G02F 1/313 359/573 |
| 6,037,189 A | 3/2000 | Goto | |
| 6,052,397 A | 4/2000 | Jeon et al. | |
| 6,411,752 B1 * | 6/2002 | Little et al. | 385/17 |
| 6,571,039 B1 | 5/2003 | Al-Hemyari et al. | |
| 6,665,486 B2 * | 12/2003 | Tomita | B82Y 20/00 372/46.01 |

(Continued)

FOREIGN PATENT DOCUMENTS

| | | | | |
|---|---|---|---|---|
| GB | 1403450 A | * | 8/1975 | |
| WO | WO 0109952 A2 | * | 2/2001 | ......... H01L 23/4822 |

OTHER PUBLICATIONS

Hiscocks et al. "Diamond waveguides fabricated by reactive ion etching," Opt. Express 16, 19512-19519 (2008).*

(Continued)

*Primary Examiner* — Peter Radkowski

(74) *Attorney, Agent, or Firm* — Alexander Akhiezer; Erik Huestis; Foley Hoag LLP

(57) ABSTRACT

A substrate is composed of a first material. A photonic structure is composed of the first material connected to one or more support structures composed of the first material between the photonic structure and a surface of the substrate, with at least one of the support structures supporting a first section of a strip of the photonic structure. The first section has a width that is wider than a width of a second section of the strip and has a length that is at least about twice the width of the second section of the strip.

35 Claims, 8 Drawing Sheets

(56) References Cited

U.S. PATENT DOCUMENTS

| | | | | |
|---|---|---|---|---|
| 7,043,115 | B2* | 5/2006 | Frick | B82Y 20/00 333/219.1 |
| 7,062,130 | B2* | 6/2006 | Telkamp et al. | 385/50 |
| 7,190,852 | B2* | 3/2007 | Heim | G02B 6/12004 385/14 |
| 7,215,854 | B2* | 5/2007 | Telkamp et al. | 385/50 |
| 7,480,434 | B2* | 1/2009 | Hochberg et al. | 385/122 |
| 7,514,853 | B1* | 4/2009 | Howe | B81B 3/0072 310/315 |
| 7,616,850 | B1* | 11/2009 | Watts | G02B 6/29335 385/2 |
| 7,941,014 | B1* | 5/2011 | Watts | B82Y 20/00 385/2 |
| 7,983,517 | B1* | 7/2011 | Watts | G02B 6/29335 385/32 |
| 8,377,320 | B2* | 2/2013 | Wang et al. | 216/48 |
| 8,538,214 | B2* | 9/2013 | Chen et al. | 385/50 |
| 8,837,544 | B2* | 9/2014 | Santori et al. | 372/42 |
| 9,100,131 | B2* | 8/2015 | Madey | H04B 10/70 |
| 2001/0016095 | A1* | 8/2001 | Tomita | B82Y 20/00 385/15 |
| 2003/0219208 | A1 | 11/2003 | Kwon et al. | |
| 2004/0071384 | A1* | 4/2004 | Heim | G02B 6/12004 385/14 |
| 2004/0120638 | A1* | 6/2004 | Frick | B82Y 20/00 385/27 |
| 2008/0131660 | A1 | 6/2008 | Noda et al. | |
| 2008/0151349 | A1* | 6/2008 | Hochberg et al. | 359/258 |
| 2010/0289408 | A1* | 11/2010 | Madey | H04B 10/70 315/39.51 |
| 2011/0149285 | A1* | 6/2011 | Chen et al. | 356/432 |
| 2011/0150397 | A1* | 6/2011 | Yi et al. | 385/74 |
| 2012/0114001 | A1 | 5/2012 | Fang et al. | |
| 2013/0107352 | A1* | 5/2013 | Santori | B82Y 10/00 359/346 |
| 2013/0209026 | A1* | 8/2013 | Doany | G02B 6/4214 385/14 |
| 2014/0064658 | A1* | 3/2014 | Ramaswamy | G02B 6/12004 385/14 |
| 2014/0212092 | A1* | 7/2014 | Roth | G02B 6/12026 385/31 |

OTHER PUBLICATIONS

Shen et al. "A Taper to Reduce the Straight-to-Bend Transition Loss in Compact Silicon Waveguides" (2010). Birck and NCN Publications. Paper 681. Available at http://docs.lib.purdue.edu/nanopub/681.*
Dumon et al. "Low-Lo0ss SOI Photonic Wires and Ring Resonators Fabricated With Deep UV Lithography" IEEE Photonics Technology Letters, vol. 16, No. 5, May 2004, pp. 1328-1330.*
Haus et al. "Optical resonators and filters." Optical microcavities (2004): 1-38.*
Sun et al. "Low-power optical bistability in a free-standing silicon ring resonator" Opt Lett. Apr. 15, 2010;35(8)1124-6.*
Paterson et al. "Optically inscribed surface relief diffraction gratings on azobenzene-containing polymers for coupling light into slab waveguides" Applied Physics Letters, 69, 3318-3320 (1996).*
Ren et al. "Nano-optomechanical Actuator and Pull-Back Instability" ACSNANO, vol. 7, No. 2, 1676-1681; (2013).*
American Wood Council "Beam Formulas With Shear and Moment Diagrams" (2005).*
Babinec et al., Design and focused ion beam fabrication of single crystal diamond nanobeam cavities, Journal of Vacuum Science & Technology B, 29, 010601 (2011).*
Bayn et al., "Triangular Nanobeam Photonic Cavities in Single-Crystal Diamond," New Journal of Physics, 13 (2011). http://nano-optics.seas.harvard.edu/publications.*
Deotare et al., "Photonic Crystal Nanobeam Cavities." In Encyclopedia of Nanotechnology, 2060-2069. Springer Netherlands. Jul. 1, 2012.*
Hausmann et al., Integrated Diamond Networks for Quantum Nanophotonics, Nanoletters, 12, 1578-1582 (2012).*
Iwase et al. , 2012. "Control of buckling in large micromembranes using engineered support structures." Journal of Micromechanics and Microengineering, 22: 065028. 2012.*
Lin et al., "Air-Clad Silicon Pedestal Structures for Broadband Mid-Infrared Microphotonics," Optics Letters, Apr. 1, 2013, vol. 38, No. 7.*
Riedrich-Möller et al., One- and two-dimensional photonic crystal microcavities in single crystal diamond, Nature Nanotechnology, vol. 7, pp. 69-74. 2012.*
Yang et al., Freestanding waveguides in silicon, Applied Physics Letters 90, 241109, 2007.*
Zhou et al., The mechanical properties of freestanding near-frictionless carbon films relevant to MEMS, J. Micromech. Microeng. 16 (2006) 1374-1381.*
Parag B Deotare and Marko Loncar. 2012. "Photonic Crystal Nanobeam Cavities." In Encyclopedia of Nanotechnology, 2060-2069. Springer Netherlands. Publisher's Version.*
Burek, Michael John. 2016. Free-Standing Nanomechanical and Nanophotonic Structures in Single-Crystal Diamond. Doctoral dissertation, Harvard University, Graduate School of Arts & Sciences, available at http://nrs.harvard.edu/urn-3:HUL.InstRepos:26718746.*
Lee et al., Ultra-low-loss optical delay line on a silicon chip, Nature Communications, 3:867,ncomms1876, 2012.*
Watts, Michael R., Adiabatic microring resonators, Optics Letters, V. 35, N. 19, p. 3231, 2010.*
Dong et al., "1×4 reconfigurable demultiplexing filter based on free-standing silicon racetrack resonators," Opt. Express 18, 24504-24509 (2010).*
Ahn et al., One-dimensional parabolic-beam photonic crystal laser, Opt. Express 18, 5654-5660 (2010).*
Babinec et al., (Design and focused ion beam fabrication of single crystal diamond nanobeam.*
Block et al., Electro-optic polymer cladding ring resonator modulators, Optics Express, V. 16, N. 22, 2008.*
Bayn et al., (Triangular Nanobeam Photonic Cavities in Single-Crystal Diamond, New Journal of Physics, 13 (2011); "Bayn").*
Almeida et al., "Nanotaper for Compact Mode Conversion," Optics Letters, vol. 28, No. 15, Aug. 1, 2008.
Bayn et al., "Triangular Nanobeam Photonic Cavities in Single-Crystal Diamond," New Journal of Physics, 13 (2011).
Burek et al., "Free-Standing Mechanical and Photonic Nanostructures in Single-Crystal Diamond," Nano Letters (2012) 12, 6084-6089.
Lee et al., "Oblique-Directional Plasma Etching of Si Using a Faraday Cage," Journal of the Electrochemical Society, 156 (7) D222-D225 (2009).
Tsuchizawa, et al., "Microphotonics Devices Based on Silicon Microfabrication Technology," IEEE Journal of Selected Topics in Quantum Electronics, vol. 11, No. 1, Jan./Feb. 2005.
Walavalkar et al., "Three-Dimensional Etching of Silicon for the Fabrication of Low-Dimensional and Suspended Devices," Nanoscale, 2013, 5, 927-931.
Yamada et al., "Si Photonic Wire Waveguide Devices," IEEE Journal of Selected Topics in Quantum Electronics, vol. 12, No. 6, Nov./Dec. 2006.

* cited by examiner

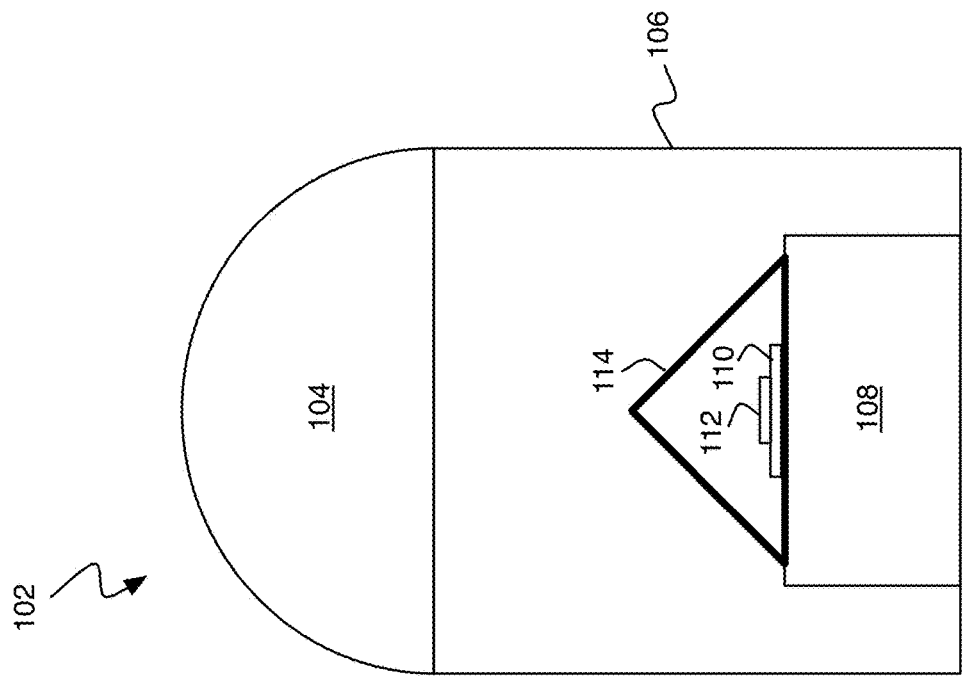
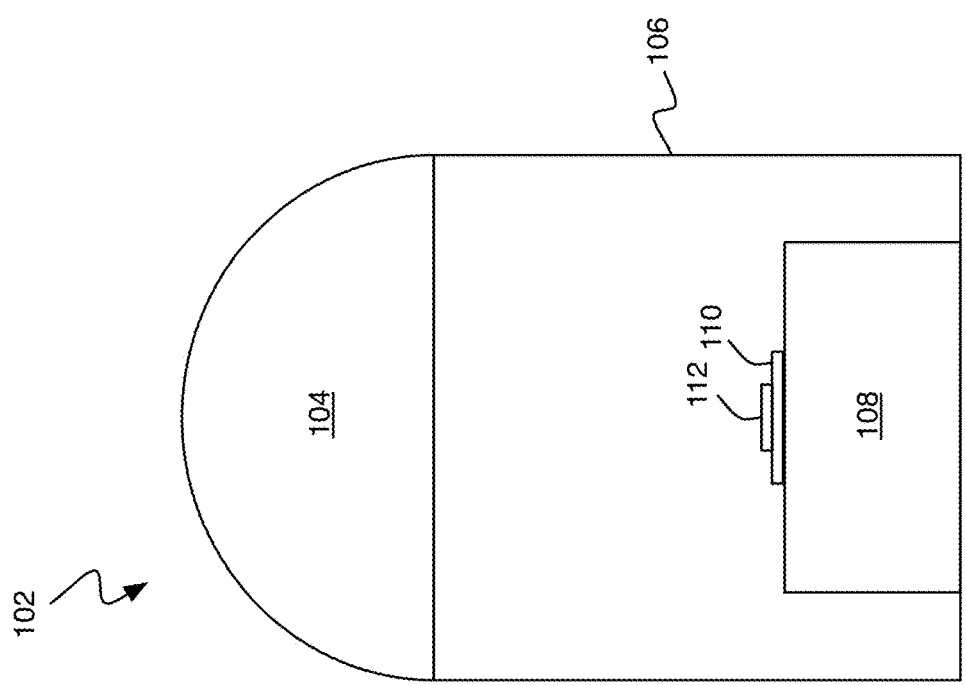

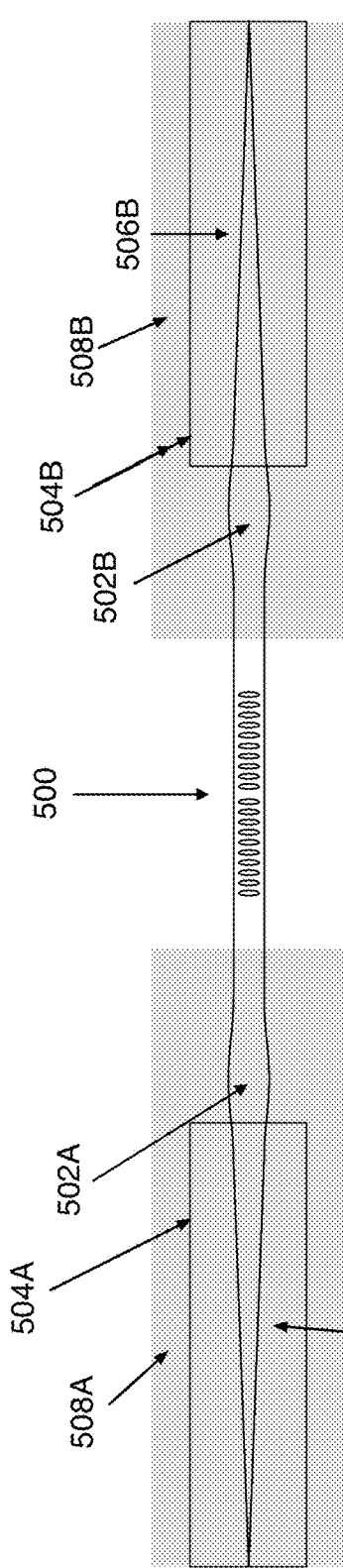
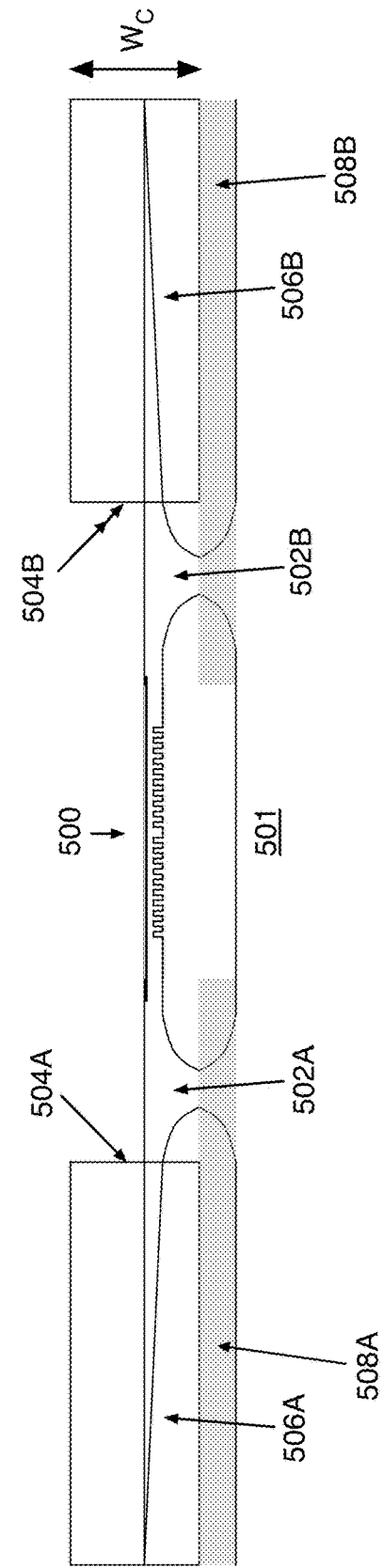
FIG. 5B
FIG. 5C

DEVICE SUPPORT STRUCTURES FROM BULK SUBSTRATES

STATEMENT AS TO FEDERALLY SPONSORED RESEARCH

This invention was made with government support under the following grants: HR0011-11-C-0073 from Defense Advanced Research Projects Agency (DARPA), W31P4Q-12-1-0017 from DARPA, and FA9550-12-1-0025 from Air Force Office of Scientific Research (AFOSR). The government may have certain rights in the invention.

BACKGROUND

This description relates to device support structures from bulk substrates.

On-chip nanoscale photonic networks are a possible solution for the interconnect bottleneck in high performance CMOS microelectronics, with many additional applications, including telecommunication components, quantum information, and biosensing. Developments in silicon nanophotonics have included silicon-on-insulator (SOI) wafer technology in which a thin silicon device layer is supported by a low-index insulating oxide layer. Optical elements used in planar photonic networks rely on light confinement provided by total internal reflection and/or distributed Bragg reflection, which requires refractive index contrast between the device and surrounding medium.

While high-quality, crystalline, thin film heterolayer structures are readily available for silicon (e.g., as SOI) there remain materials with attractive properties for which high quality thin film heterolayer structures are not available. These include linear and non-linear optical materials including non-linear optical crystals like lithium niobate (LiNbO3) and potassium titanyl phosphate (KTP), silicon-containing materials such as silicon carbide (SiC), III-V semiconductor materials such as III-V nitrides like gallium nitride (GaN) and alloy systems like aluminium gallium nitride (AlGaN), II-IV semiconductor materials such as zinc sulfide (ZnS), metal oxides such as titanium dioxide ($TiO_2$), inert single-crystals such as diamond, and other single-crystal materials. Some of these materials provide advantages for on-chip photonic circuits due to certain beneficial material properties (e.g., compared to silicon). To this end, substantial work has been done to heterogeneously integrate new materials, including those listed above, on foreign substrates. While these efforts have made promising advances, some techniques encounter certain obstacles such as compromised material quality, significant surface roughness, and poor device layer uniformity and reproducibility.

SUMMARY

In one aspect, in general, a method comprises: forming an etch mask on a first surface of a substrate, the etch mask including a strip that has at least a first section having a width that is wider than a width of a second section of the strip and having a length that is at least about twice the width of the second section of the strip; and etching the substrate through the etch mask, including removing a portion of the substrate to form at least a portion of a photonic structure suspended over an etched surface of the substrate by one or more support structures, including a first support structure that has a shape determined by the first section of the strip of the etch mask.

Aspects can include one or more of the following features.

The first section has a width that is wider than a third section of the strip.

The first section includes a first tapered section between the first section and the second section, and a second tapered section between the first section and the third section.

Etching the substrate includes removing portions of the substrate under the strip.

The portions of the substrate under the strip that are removed include: a first portion of the substrate under the second section of the strip leaving a gap between a portion of the photonic structure and the etched surface of the substrate, and a second portion of the substrate under the first section of the strip leaving the first support structure under a portion of the photonic structure.

The substrate comprises: a linear optical material, a non-linear optical material, a III-V or III-VI alloy semiconductor material, a II-VI or II-VI alloy semiconductor material, a metal oxide, a silicon-containing material, or a single-crystal material.

The substrate comprises diamond.

The first section has a width that is at least about 1% to 50% wider than a width of the second section of the strip.

The first section has a length that is at least about 10 times the width of the second section of the strip.

The portion of the photonic structure suspended over the etched surface of the substrate has a triangular cross-section.

The portion of the photonic structure suspended over the etched surface of the substrate is perforated with holes.

In another aspect, in general, an article of manufacture comprises: a substrate composed of a first material; and a photonic structure composed of the first material connected to one or more support structures composed of the first material between the photonic structure and a surface of the substrate, with at least one of the support structures supporting a first section of a strip of the photonic structure, where the first section has a width that is wider than a width of a second section of the strip and has a length that is at least about twice the width of the second section of the strip.

Aspects can include one or more of the following features.

13. The article of manufacture of claim 11, wherein the first section has a width that is wider than a third section of the strip.

The first section includes a first tapered section between the first section and the second section, and a second tapered section between the first section and the third section.

The strip of the photonic structure includes suspended portions that include a gap between the suspended portion and the substrate.

The strip of the photonic structure comprises a waveguide.

The photonic structure comprises a ring resonator.

The first material comprises: a linear optical material, a non-linear optical material, a III-V or III-VI alloy semiconductor material, a II-VI or II-VI alloy semiconductor material, a metal oxide, a silicon-containing material, or a single-crystal material.

The first material comprises diamond.

The first section has a width that is at least about 1% to 50% wider than a width of the second section of the strip.

The first section has a length that is at least about 10 times the width of the second section of the strip.

The strip of the photonic structure has a triangular cross-section.

The strip of the photonic structure is perforated with holes.

In another aspect, in general, an apparatus comprises: a waveguide connected to one or more support structures, including a first support structure supporting a first section of the waveguide having a width that is wider than a width of a second section of the waveguide and having a length that is at least about twice the width of the second section of the waveguide; and at least one waveguide coupler configured to couple to a portion of the waveguide.

The first support structure is connected to a substrate.

The waveguide coupler is coupled to a portion of the waveguide that is suspended over the substrate.

The waveguide coupler surrounds the portion of the waveguide that is suspended over the substrate.

The portion of the waveguide that is suspended over the substrate is tapered within the waveguide coupler.

The waveguide, the first support structure, and the substrate are each composed of a first material.

The first material comprises: a linear optical material, a non-linear optical material, a III-V or III-VI alloy semiconductor material, a II-VI or II-VI alloy semiconductor material, a metal oxide, a silicon-containing material, or a single-crystal material.

The first material comprises diamond.

The waveguide coupler is composed of a second material different from the first material.

The second material has a lower refractive index than the first material.

The apparatus further comprises a third material, different from the first material and the second material, between the waveguide coupler and the substrate.

The third material has a lower refractive index than the second material.

The apparatus comprises at least two waveguide couplers, each coupled to a different portion of the waveguide.

The waveguide has a triangular cross-section.

The waveguide is perforated with holes.

Aspects can have one or more of the following advantages.

An approach to realizing nanophotonic devices in materials includes fabricating the devices from the starting bulk substrate itself. Any of a variety of fabrication processes can be used for realizing suspended nanostructures in bulk media, such as a single-crystal. One fabrication process, which is described in detail in PCT Application Ser. No. Ser No. PCT/US2013/020322, entitled "SMALL-SCALE FABRICATION SYSTEMS AND METHODS," incorporated herein by reference, employs anisotropic plasma etching performed at an oblique angle to the substrate surface (referred hereafter as 'angled-etching'). Using an anisotropic plasma etcher, the angled-etching process yields triangular cross-section suspended nanobeams directly from bulk substrates. Bulk nanomachining techniques, such as those exploiting multi-step anisotropic/isotropic etching, can also be used to provide lateral undercutting of bulk media to also yield suspend nanostructures. Additionally, etching techniques involving ion beam etching (IBE) of materials—such as focused ion beam (FIB) milling, reactive ion beam etching (RIBE), and chemically assisted ion beam etching (CAIBE)—may be utilized to yield suspended nanostructures from bulk substrates.

In order to realize integrated photonics in bulk materials, support structures, which provide physical support between one or more portions of the nanophotonic device and the bulk substrate, are fabricated to enable a free-standing device, and are configured to reduce the possibility of sustaining substantial optical losses due to the presence of those support structures. For example, vertical support structures may be distributed at necessary points along a waveguide that provides a photon routing path or under suspended portions of nanophotonic devices fabricated from starting bulk substrates. The support structures enable chip-scale integration of a variety of photonic structures including waveguides and various photonic devices. For example, the support structure will allow routing of light into and from photonic devices fabricated in bulk substrates, while providing physical support and maintaining sufficiently low optical loss throughout the optical circuit of devices and interconnecting waveguide sections.

In some implementations, the support structures can be fabricated using the same steps that are being performed to define the base nanophotonic elements out of the bulk material. For example, using the same steps performed in an angled-etching fabrication methodology that utilizes anisotropic plasma etching, by selecting the appropriate etch mask features (described in more detail below), the support structures may be applied to a host of different materials, including materials which may not be etched isotropically (e.g., diamond).

As an example of a type of device that may benefit from the use of low loss support structures, an ultra-high quality-factor (Q-factor) optical nanocavity in the form of an on-chip racetrack resonator incorporating two such supports, fabricated from bulk diamond (single-crystalline or poly-crystalline), is described in more detail below. Other scenarios are also presented for implementing the low loss support structure design, such as to guide light around a substrate and connect various optical components.

Nanophotonic structures such as waveguides, ring resonators, and photonic crystal cavities, can be fabricated using a variety of bulk nanomachining techniques resulting in undercut structures that are physically attached to the substrate at some point in order to maintain a free-standing structure, and thus, the necessary index contrast for nanophotonic device operation. Using these the techniques described herein, the free-standing structures are able to extend beyond the attachment points (e.g., instead of being truncated at the attachment points), extending the overall device size, distance photons may be routed on-chip, and level of final integration. The use of a single material for the fabricated photonic structures and the support structures also provides good thermal stability since it avoids the different amounts of thermal expansion, and resulting mechanical stress, caused by support structures made out of a different material. These advantages facilitate creation of chip-scale photonic networks from bulk substrates.

Other features and advantages of the invention are apparent from the following description, and from the claims.

DESCRIPTION OF DRAWINGS

FIGS. 1A and 1B are schematic diagrams of a fabrication system.

FIGS. 5B and 5C are top and side views, respectively, of an on-chip waveguide coupling scheme for the device of FIG. 5A.

DESCRIPTION

Figure 2B:
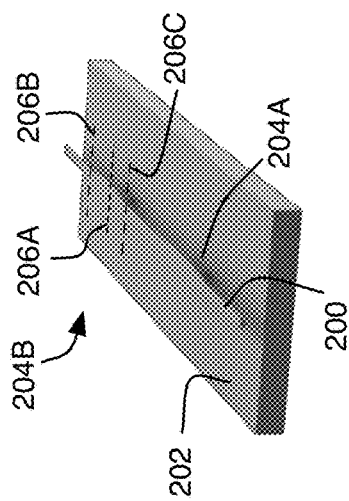
FIGS. 2A and 2B are different oblique views of a fabricated photonic structure.

Referring to FIG. 1A, an example of a fabrication system that can be used to form photonic structures supported by the support structures described herein includes a plasma etch system 102, which includes a plasma source 104, and a chamber 106. Inside the chamber 106, is a sample stage 108 for supporting a sample 110 comprising the bulk substrate in which the photonic structures are to be formed (e.g., a single-crystal or other uniform material). A patterned film of a material is constructed on the surface of the substrate to mask selected areas on the surface of the substrate that are to be protected from the etching process. Any of a variety of microfabrication processes (e.g., lithographic and deposition techniques) may be employed to manufacture the etch mask 112. The etch mask material and thickness may be selected to provide adequate protection in the subsequent anisotropic plasma etching. The necessary etch mask film thickness may be scaled depending on the required duration of subsequent anisotropic plasma etching steps. Features of the etch mask 112 are formed such that sections of the etch mask 112 that correspond to portions (e.g., strips) of photonic structures that will be supported by support structures have a width that is wider than surrounding portions of the photonic structure. As described in more detail below, these wider portions will be formed by residual bulk material remaining under corresponding sections of the etch mask 112.

Referring to FIG. 1B, during operation of the plasma etch system 102, plasma ions from the plasma source 104 etch the top surface of the sample 110 after passing through openings in the etch mask 112. In some fabrication steps, the sample 110 is enclosed in a conductive enclosure 114 supported by the sample stage 108. The conductive enclosure 114 (e.g., a Faraday cage) encloses the sample 110 all sides, including the bottom by a bottom plate, and has openings on sides above the sample stage 108 through which ions from the plasma source 104 may pass to etch the sample 110. For example, anisotropic plasma etching can be carried out on the prepared sample 110, for example, using the following two-part process. A top-down plasma etching step is performed without the enclosure 114 to remove material in the direction substantially perpendicular to the sample surface to a desired depth. In an angled-etching step, the enclosure 114 is employed to yield one or more photonic structures are supported at selected locations by support structures.

The enclosure 114 can be configured to have a geometry that is selected based on a target geometry of one or more structures to be etched in the sample 110. For example, a Faraday cage having a triangular metallic mesh structure may be used to fully enclose the sample 110 and allow the simultaneous anisotropic plasma etching from two slanting opposite angles. The incline angle of the top sides of the Faraday cage defines the ion-incident angle relative to the surface normal of the sample 110.

Figure 2A:
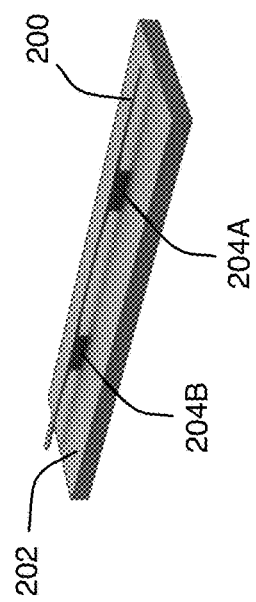

FIGS. 2A and 2B show schematic views of an exemplary high-index waveguide 200 fabricated by angled-etching, which is attached to a substrate 202 by two support structures 204A and 204B, allowing most of the waveguide 200 to remain free-standing after fabrication, and thus operate as an air-clad waveguide. The support structures 204A and 204B are formed by changing the width of the strip of the etch mask 112 that defines the waveguide 200 such that there is a section of that strip that is wider than the neighboring sections on at least one side (e.g., by around 1%-50%). The etch time needed to fully etch under the waveguide that is being formed, leaving a gap between the waveguide and the etched surface of the substrate 202, depends on various parameters. Given the desired waveguide geometry and corresponding etch time, a pedestal-like cross-section (as shown in FIG. 2C) is achieved at a location 206A within the wider section of the etched structure, with a top waveguide portion 208A of width $W_2$ supported on a thinner material segment 210 attached to the bulk substrate 202. While the segment 210 serving as a support structure is shown in FIG. 2C having a uniform width between the waveguide portion 208A and the substrate 202, this segment 210 may vary in width (e.g., becoming wider as it approaches the surface of the substrate 202), depending on the particular fabrication techniques used to undercut the material below the waveguide portions 208A.

Figure 2D:
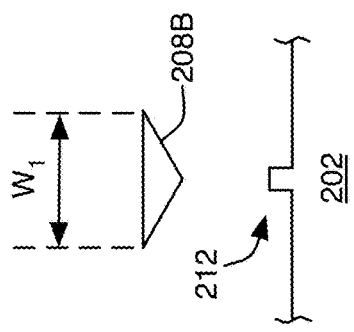
FIGS. 2C and 2D are schematic diagrams of cross-sections of the photonic structure of FIGS. 2A and 2B.
Figure 2C:
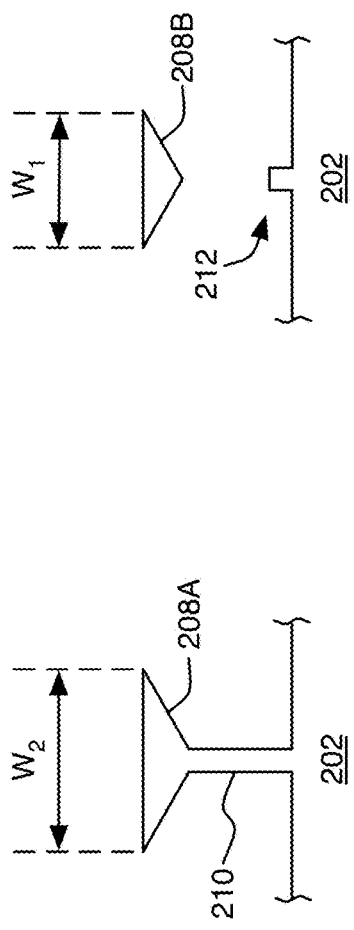

Referring to FIG. 2D, the waveguide 200 has a cross-section of a free-standing waveguide portion 208B of width $W_1$ (where $W_1 < W_2$) over most of its length, including on either side of the support structure 204B (e.g., at locations 206B and 206C). There may be residual material 212 that protrudes from the substrate 202 under the free-standing portion 208B that is suspended over the substrate 202, however, there is sufficient air surrounding the free-standing waveguide portion 208B (e.g., an air gap at least around 1-5 times the thickness of the waveguide portion 208B) to enable it to function as an air-clad waveguide that defines a transverse mode profile of the guided electromagnetic wave. The entire waveguide 200 is therefore able to efficiently route photons around an on-chip photonics platform that incorporates the substrate 202. The amount by which the width of the wider supported waveguide portion 208A exceeds the width of the free-standing waveguide portion 208B affects the potential loss experienced by a photon traversing the waveguide 200. There may be a trade-off between different performance characteristics of the resulting structures. A smaller width difference (e.g., around 1%-5%) may enable lower loss, while a larger width difference (e.g., around 25%-50%) may provide thicker/stronger support structures or more reliable or reproducible fabrication results. While a range of around 1% to 50% may be appropriate for a wide variety of implementations, a narrower range of around 5%-25% may be more practical for certain structures, fabrication procedures, and/or materials. Note, the percentage values provided as examples are in reference to the ratio $(W_2 - W_1)/W_1$.

Figure 2E:
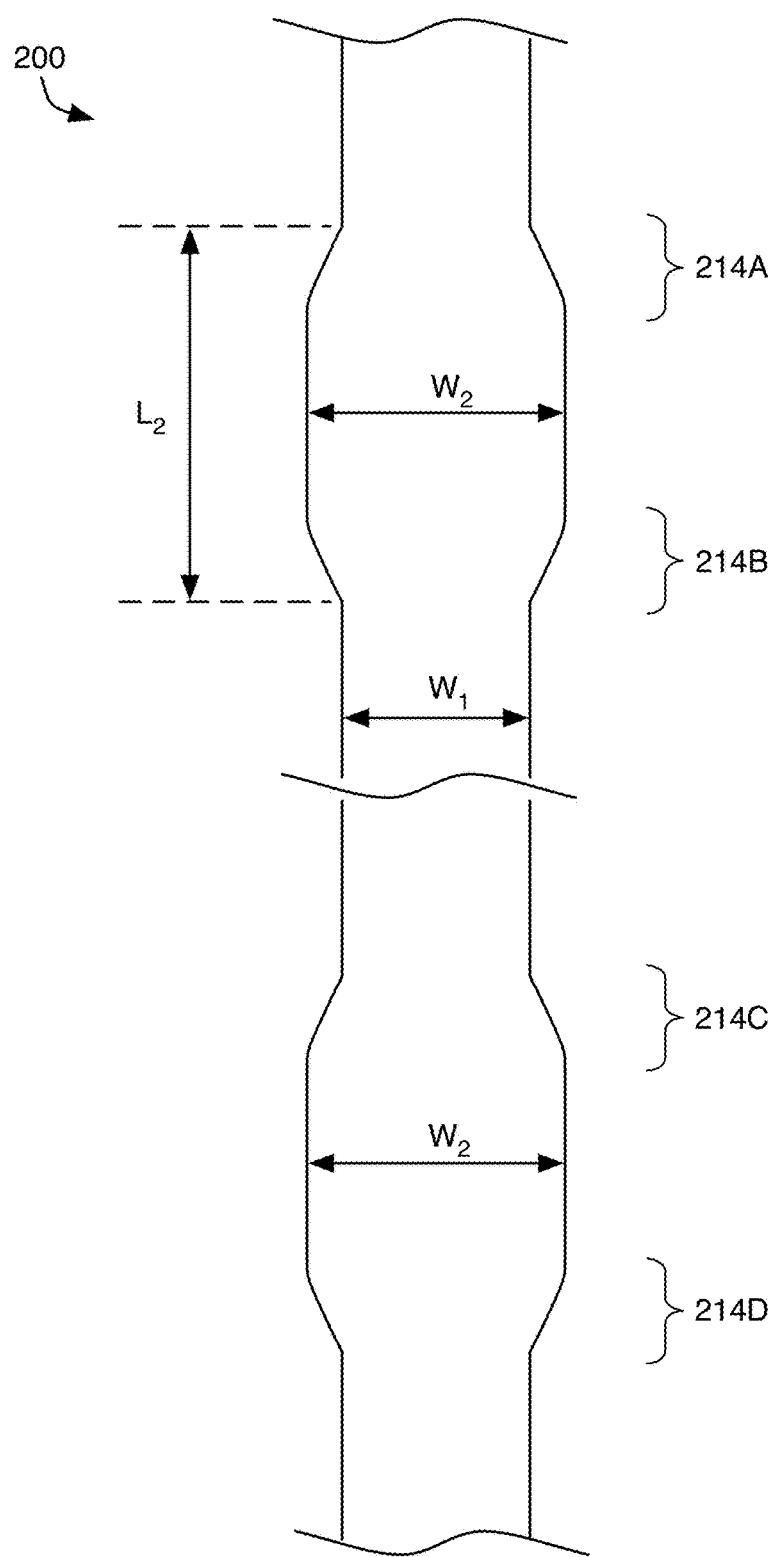
FIG. 2E is a schematic diagram of a top view of the photonic structure of FIGS. 2A and 2B.
Figure 2F:
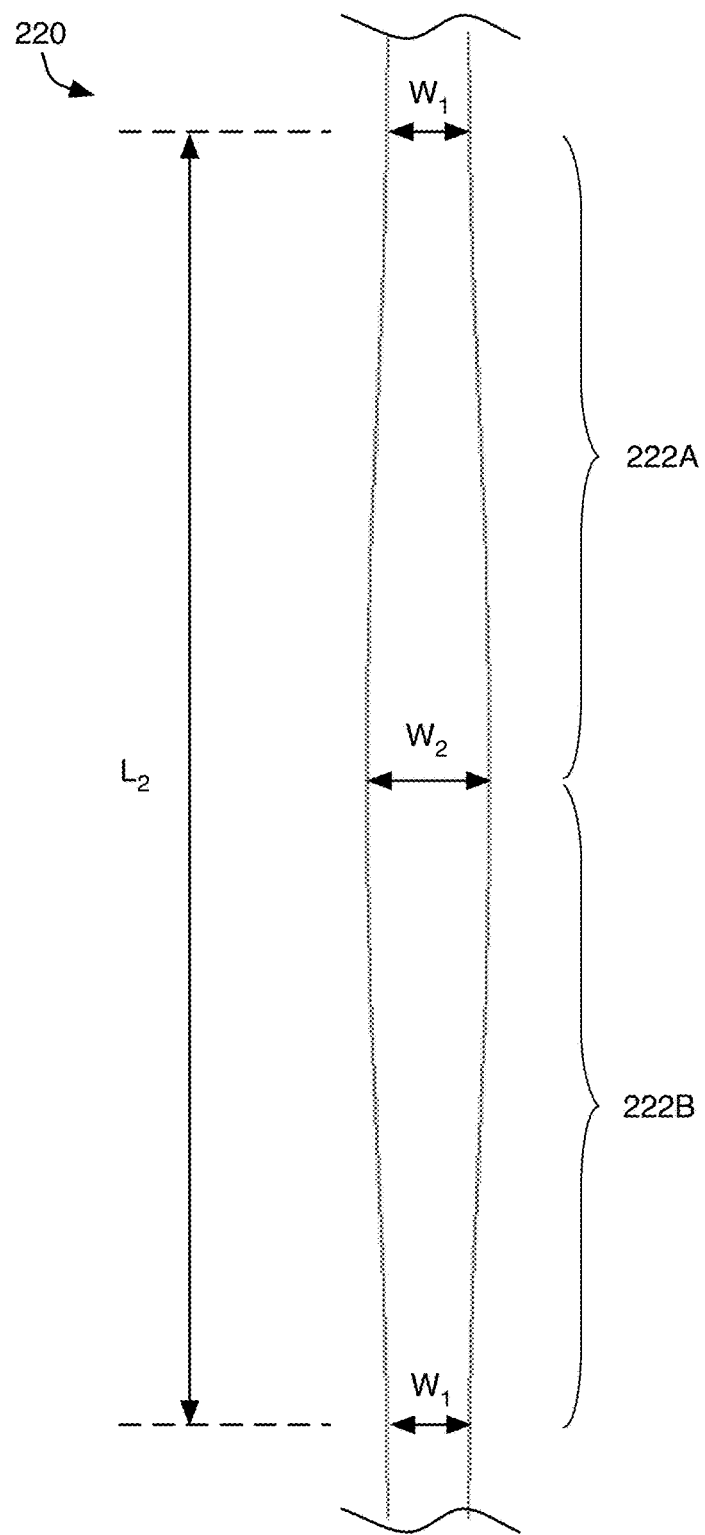
FIG. 2F is a schematic diagram of a top view of an alternative photonic structure.

In some implementations, the etch mask 112 is designed to provide a transition between the width $W_2$ of the supported waveguide portion 208A and the width $W_1$ of the free-standing waveguide portion 208B that is gradually tapered to prevent a sudden change in the mode profile of the waveguide 200 that could lead to excessive optical losses (such as scattering or loss to the bulk substrate). For example, FIG. 2E shows a top view of the waveguide 200 with tapered sections 214A-214D on either side of the wider waveguide sections over the support structures 204A and 204B. These tapered sections 214A-214D can have a linear shape or any other shape (e.g., quadratic) that provides smooth transition between the two widths. Some implementations may use a length $L_2$ of the entire tapered waveguide section that provides a tradeoff between a length that is long enough to provide an adiabatic transfer of light between the transverse spatial modes defined by the narrower triangular cross-section of the waveguide portion 208B and the wider triangular cross-section of the waveguide portion 208A, and a length that is short enough to reduce the total length of the segment 210 and any resulting loss of energy to the bulk substrate 202 through the segment 210. In some implementations, including in the example of FIG. 2E, the length $L_2$ of the entire tapered waveguide section, including the tapered sections 214A and 214B and the wider waveguide between them, is at least about twice the width $W_1$ of the free-standing waveguide portion. FIG. 2F shows an example of dimensions of a waveguide portion 220 for which a quadratic function was used to determine the shape of tapered section 222A and 222B, which in this example are adjacent to each other. The length of each of the tapered sections 222A and 222B is about 10 microns. The width of the waveguide portion 220 where the tapered sections 222A and 222B meet is $W_2=1.3$ microns, and the width of the waveguide portion 220 at the ends of the tapered sections 222A and 222B is $W_1=1.125$ microns. In some implementations, including in the example of FIG. 2F, the length $L_2$ of the entire tapered waveguide section is more than 10 times the width $W_1$ of the free-standing waveguide portion. In some implementations, the leading and trailing tapered sections on either side of the widest portion of width $W_2$ (e.g., 214A and 214B for waveguide 200, or 222A and 222B for waveguide 220) are not symmetric. For example, they may have different lengths, and/or different taper functions that determine their shape. One example in which the leading and trailing tapered sections would be asymmetric is for a tapered waveguide section that transition from a waveguide of width $W_1$ to a waveguide of a different width $W_3$, where $W_3<W_1$, and $W_2>W_3$ and $W_2>W_1$.

Another parameter that can be tuned is the distance between neighboring support structures. The distance that ensures the unsupported waveguide sections between neighboring support structures is not likely to break and adhere to the substrate depends on the material being used. For example, in diamond, this distance could be around 100 microns for a straight waveguide with dimensions appropriate for guiding photons at wavelengths typically used for telecommunications applications (e.g., around 1.3-1.6 microns). For a curved waveguide, the placement of particular support structures and the distance between neighboring support structures may depend on the particular shape and the radius of curvature at various sections of the waveguide. Additionally, the described support structures do not necessarily have to be positioned under straight waveguide sections. The support structures may also be positioned under curved waveguide sections, where the support structure geometry is mapped onto the shape of the curved waveguide section.

Figure 3:
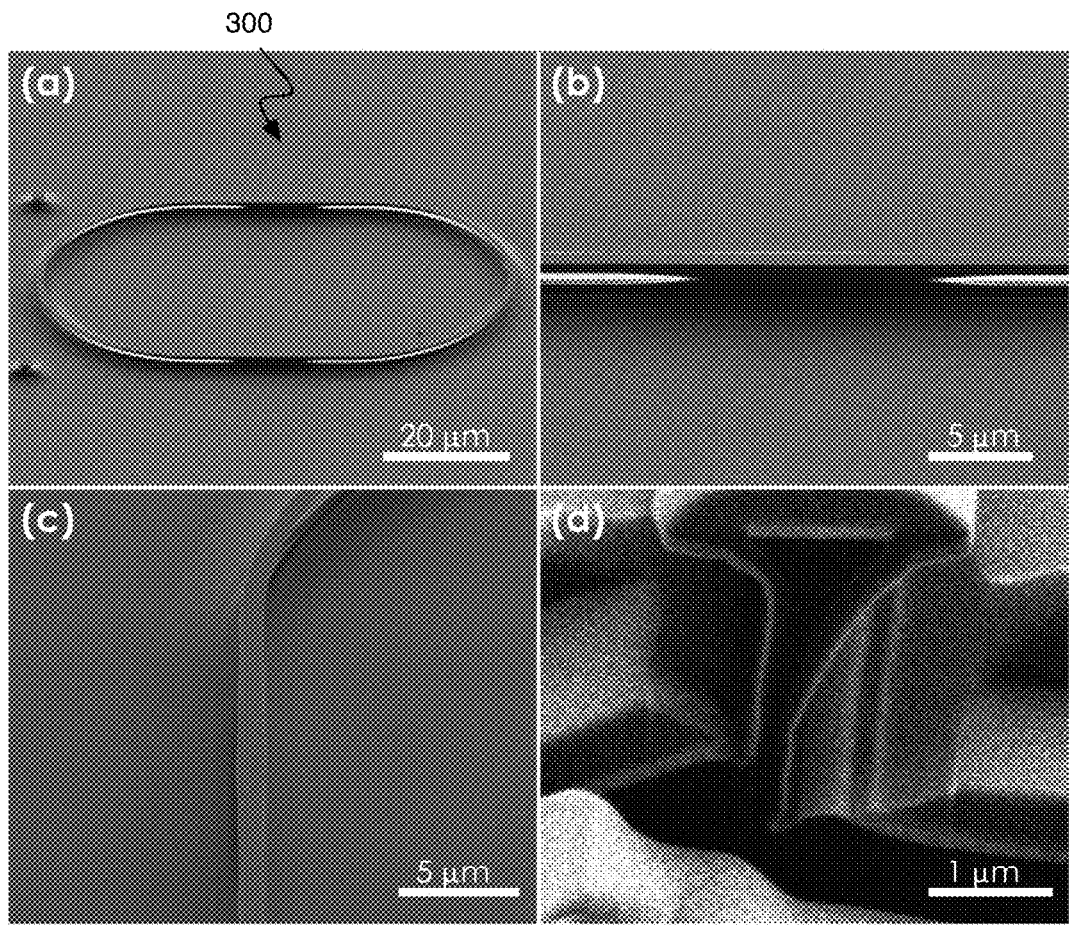
FIG. 3A is a view of a racetrack resonator.
FIG. 3B is a close-up view of a support structure of the racetrack resonator.
FIG. 3C is a close-up top view of a wider portion of a waveguide supported by a support structure merging into a bend of the racetrack resonator.
FIG. 3D is an SEM image of a cross-sectioned support structure near its maximum width.

One example of a photonic device that can be suspended over a substrate of the same material supported by the tapered support structures is a racetrack resonator (also called a ring resonator) incorporating two such support structures. FIG. 3A shows a racetrack resonator device 300, which can be fabricated in bulk single-crystal diamond via angled-etching. An experimental fabricated version of the device 300 yielded experimental results indicating that energy loss due to the support structure is relatively low. In the conceptual sense, a ring resonator is a waveguide that has been looped back on itself, such that light coupled into the waveguide is resonant when the round trip optical path length is an integer multiple of the wavelength. Energy confined by the resonator at a given resonance wavelength is lost through several common mechanisms, all of which are summarized in the optical Q-factor of the device. A high Q-factor indicates little energy loss per round trip, with values $>10^4$ generally considered high and on the order of comparable silicon ring resonators fabricated in SOI. The experimental fabricated version of the racetrack resonator device 300 had a 50 micron diameter, and the suspended waveguide of the device had a width and height approximately 1.2 microns and 500 nm, respectively, with a triangular cross-section resulting from the angled-etching fabrication. The radius of curvature of the bends (shown in FIG. 3C) was approximately 25 microns, and the length of each straight portion, which includes the tapered support structure (shown in FIG. 3B), was approximately 20 microns. Tapering of the waveguide width was designed to increase quadratically in and decrease quadratically out of the wider supported section, with the maximum width in the middle of the supported section increased approximately 15% relative to the rest of the suspended waveguide. For a particular etch time, the larger widths of the supported sections yielded the two support structures attached to the substrate, which maintains the free-standing device. FIG. 3D shows a focused ion beam (FIB) milled cross-section view of the tapered support structure near the point of maximum width. Here, the pedestal nature of the vertical support is revealed. The irregularity of the cross-section is a consequence of the etch parameters, and not by design. Design parameters of the etch mask 112, including the width and length of the wider supported sections that yield the tapered support, the length of the tapered sections, and the taper function (e.g., linear, quadratic, sinusoidal), are all subject to optimization based on various features of the device being fabricated and the substrate material, for example.

Figure 4:
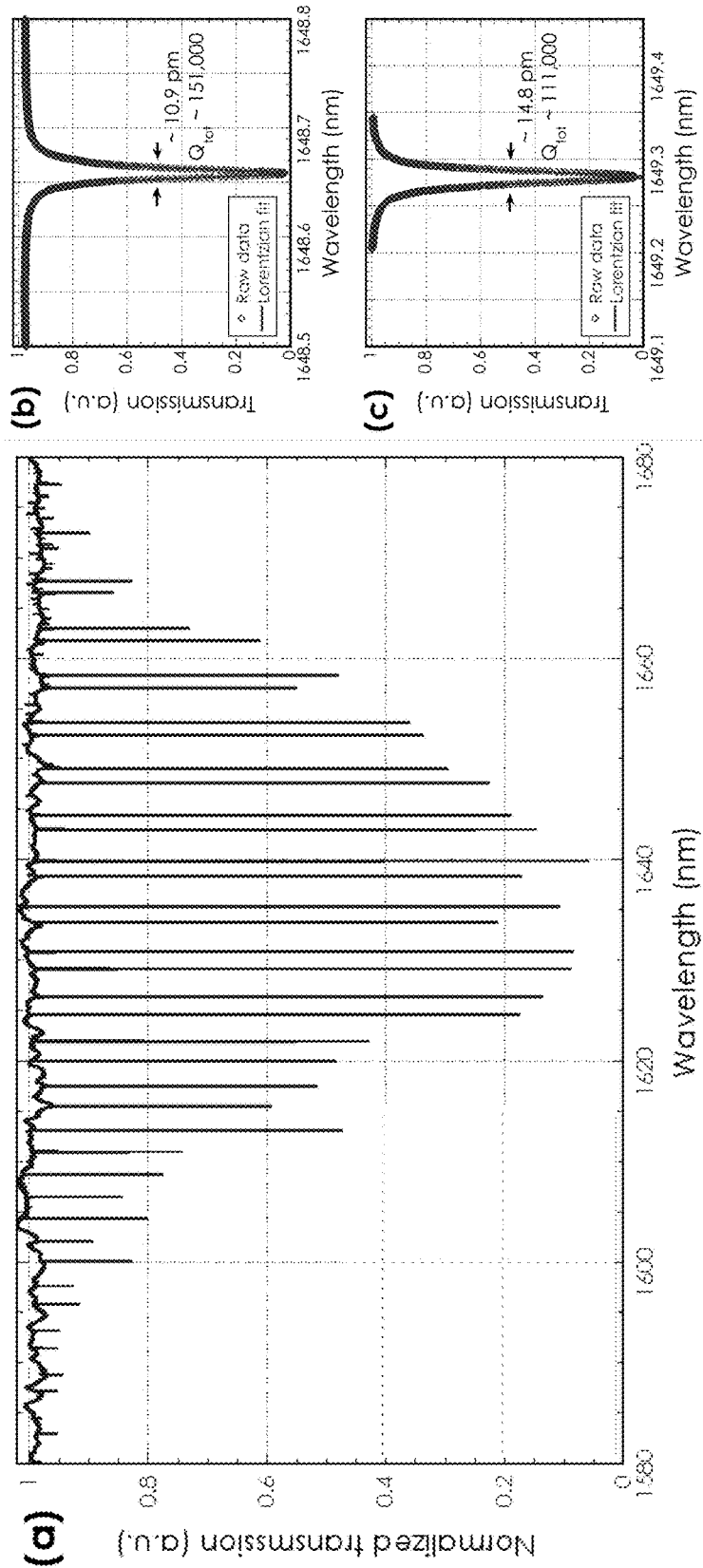
FIG. 4A is a representative normalized broadband spectrum of the racetrack resonator.
FIGS. 4B and 4C are high-resolution spectra of two selected resonances from the broadband spectrum in FIG. 4A.

FIG. 4A shows a broadband transmission spectrum of the experimental fabricated version of the racetrack resonator device 300. The spectrum was collected by a tapered fiber measurement, in which a tapered optical fiber is positioned adjacent to the racetrack resonator device 300 to evanescently couple light propagating in the optical fiber into the device 300. Clear transmission dips at the locations of optical resonances are observed, indicating successful operation of the resonator device 300. FIGS. 4B and 4C show two high resolution measurements of selected resonances from the broadband spectrum in FIG. 4A. The loaded optical Q-factors extracted from high resolution measurements are both greater than $10^5$, confirming the support structures are indeed low loss. As such, these support structures may be deployed as necessary to efficiently route optical signals into and out of suspended structures of integrated on-chip photonic networks fabricated from bulk materials. These suspended structures include waveguides and various kinds of photonic devices, including photonic devices that incorporate waveguide structures.

Figure 5A:
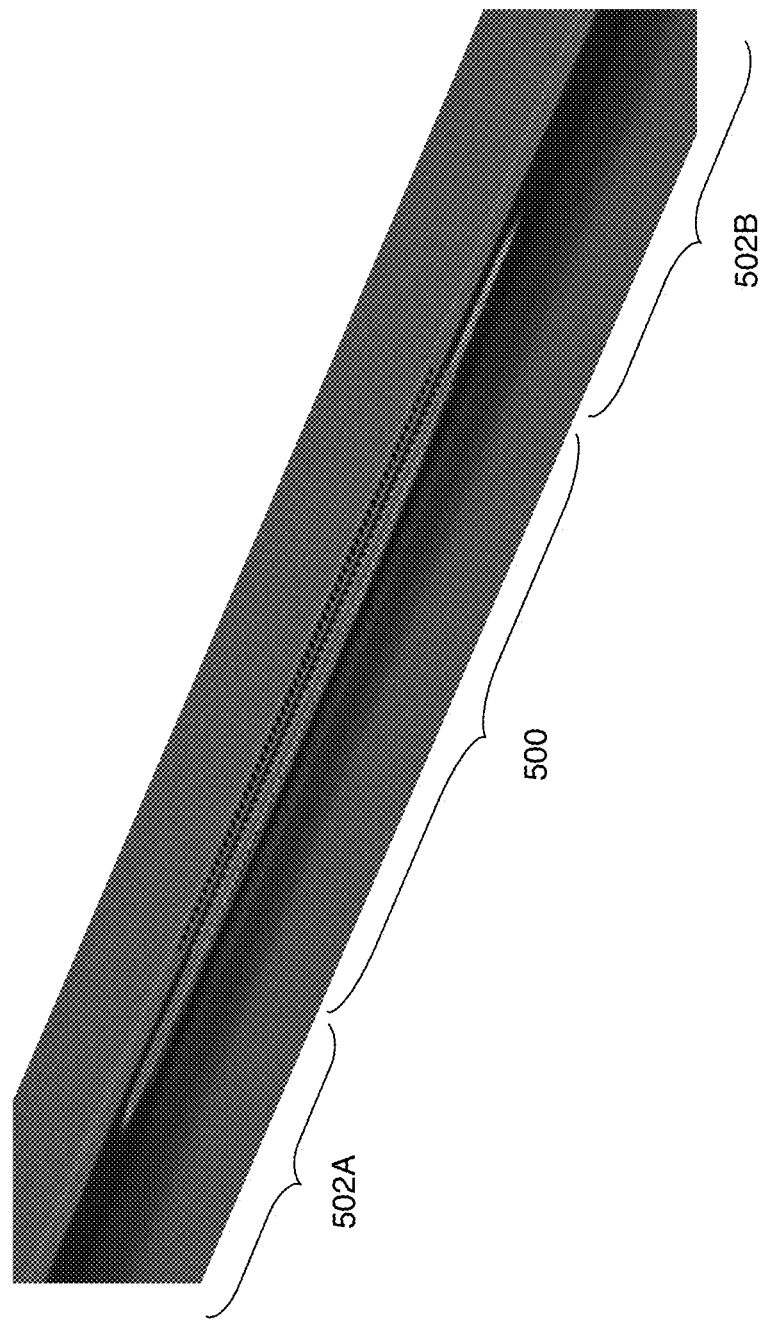
FIG. 5A is an oblique view of a nanobeam cavity device suspended between supported waveguide coupling sections.

Another example of a photonic device that incorporates a waveguide structure that can be suspended using the support structures is a one-dimensional photonic crystal nanobeam cavity. FIG. 5A shows an example of a nanobeam cavity device 500. The nanobeam cavity device 500 can be fabricated, for example, from single-crystal diamond by perforating a suspended portion of the triangular cross-section waveguide with a chirped one-dimensional lattice of air holes. The lattice of air holes perforating the waveguide form a nanobeam photonic crystal cavity (or simply "nanobeam cavity"). In this example, unlike the racetrack resonator device 300 in which the support structures supported a portion of the device 300 itself, the support structures support waveguide coupling sections 502A and 502B used to couple light into and out of the nanobeam cavity device 500 using any of a variety of on-chip coupling schemes. Thus, in various photonic devices, including this nanobeam cavity device 500, the support structures support elements (e.g., coupling sections) that are integral with the photonic device (i.e., composed of the same material and connected to it), but not necessarily considered part of the photonic device itself.

For the example shown in FIGS. 5B and 5C, the waveguide coupling sections 502A and 502B include a short taper into the nanobeam cavity device 500 at one end, and include extended tapered waveguide portions 506A and 506B at the other end to gradually adjust the guided transverse spatial mode between that of the nanobeam cavity device 500 and that of larger waveguide couplers 504A and 504B, which are composed of a different material surrounding the portions 506A and 506B and resting on spacer layers 508A and 508B, as described in more detail below. FIGS. 5B and 5C show top and side views, respectively, of an example of an on-chip waveguide coupling scheme. In this scheme, the waveguide couplers 504A and 504B on either side are used to transfer light originating from an off-chip source into and out of the nanobeam cavity device 500 suspended over the substrate 501 by the supported waveguide coupling sections 502A and 502B. The waveguide coupling provided by the combination of the waveguide coupling sections 502A and 502B and the waveguide couplers 504A and 504B may also be referred to as spot-size conversion.

Coupling into the device 500 (from the right side) is achieved, for example, by overlapping the spatial mode of the extended tapered waveguide portion 506B with the spatial mode of the in-coupling waveguide coupler 504B such that light propagating in the waveguide coupler 504B is adiabatically transferred from the coupler 504B (with a spatial mode of width $W_C$) into the waveguide coupling section 502B (with a spatial mode of width $W_2$ at its center), and adiabatically transferred from the waveguide coupling section 502B into the nanobeam cavity device 500 (with a spatial mode of width $W_1$). Hence, light propagating from right to left gradually goes from being guided within the waveguide coupler 504B as a core cladded by air (on top and either side) and a spacer layer 508B (on the bottom) to being guided within the small but growing tapered waveguide portion 506B as a core cladded by the surrounding waveguide coupler 504B. Light then propagates through the nanobeam cavity, and out again through the waveguide coupling section 502A and out-coupling waveguide coupler 504A on the other side. Note that the out-coupling waveguide coupler 504A operates in the reverse manner as the in-coupling waveguide coupler 504B such that light is adiabatically transferred from the waveguide coupling section 502A to the waveguide coupler 504A using the spatial mode overlap provided by the extended tapered waveguide portion 506A.

In the on-chip coupling scheme described above, there are many design options for both the materials used and the adiabatic transfer of light from the waveguide couplers 504A and 504B to the suspended device 500. For example, the waveguide couplers 504A and 504B may be polymers, such as SU-8 resist, which can be spun onto the substrate 501 and defined lithographically. The cross-section of the waveguide couplers 504A and 504B may have any of a variety of shapes (e.g., square), depending on the manner of their fabrication. It is useful to have the waveguide couplers 504A and 504B surrounding the internal extended tapered waveguide portions 506A and 506B themselves be surrounded by a material of lower refractive index. On the top and sides of the waveguide couplers 504A and 504B, air typically acts as a low index cladding. Given the low refractive index (n) of many polymers (e.g., SU-8, n~1.67), it may be useful to include lower index spacer layers 508A and 508B (e.g., SiO2, n~1.5) between the waveguide couplers 504A and 504B and high index bulk substrate 501 (e.g., diamond, n~2.4), as shown in the example of FIGS. 5B and 5C. Alternatively, the waveguide couplers 504A and 504B may be defined in a higher index material (e.g., silicon, n~3.3) than the bulk substrate 501, in which case the low index spacer layers 504A and 504B are not necessary.

In addition to angled-etching, other fabrication techniques can be used to form photonic devices in bulk substrates that include the support structure described herein, with potentially some differences in the shape of the cross-section of the support structures and/or the device supported by the support structures. Various bulk nanomachining fabrication techniques use different combinations of anisotropic and/or isotropic etching steps to laterally undercut a bulk media and yield suspend nanostructures. In many of the bulk nanomachining fabrication techniques, the device width defined by the etch mask also determines—either directly or indirectly—the final device height. In some fabrication techniques, such as the angled-etching scheme described above using the enclosure 114, the device width directly determines the device height via the etch angle, allowing optimization of the etch time to form the support structures described herein. In some fabrication techniques (such as the technique described in Lin et al., "Air-clad silicon pedestal structures for broadband mid-infrared microphotonics," Optics Letters, Vol. 38, No. 7, p. 1031, Apr. 1, 2013), isotropic etching is used to laterally undercut the material, thus the device width determines the degree of undercut for a given etch time. Therefore, the isotropic etch time may also be optimized to form the support structures described herein.

It is to be understood that the foregoing description is intended to illustrate and not to limit the scope of the invention, which is defined by the scope of the appended claims. Other embodiments are within the scope of the following claims. For example, some embodiments use other etch techniques for realizing nanophotonic devices from a bulk substrate, or some embodiments may result in final photonic device cross-sections besides triangular (e.g., rectangular or trapezoidal).

What is claimed is:
1. An article of manufacture comprising:
a substrate composed of a first material; and
a photonic structure composed of the first material connected to one or more support structures composed of the first material between the photonic structure and a surface of the substrate, with at least one of the support structures supporting a first section of a strip of the photonic structure, where the first section has a width that is wider than a width of an adjacent second section of the strip and has a length that is at least about twice the width of the second section of the strip, the second section lacking a support structure between the second section and the surface of the substrate, the photonic structure providing adiabatic transfer of light between the first and second sections.

2. The article of manufacture of claim 1, wherein the first section has a width that is wider than a third section of the strip.

3. The article of manufacture of claim 2, wherein the first section includes a first tapered section between the first section and the second section, and a second tapered section between the first section and the third section.

4. The article of manufacture of claim 1, wherein the strip of the photonic structure includes suspended portions that include a gap between the suspended portion and the substrate.

5. The article of manufacture of claim 1, wherein the strip of the photonic structure comprises a waveguide.

6. The article of manufacture of claim 5, wherein the photonic structure comprises a ring resonator.

7. The article of manufacture of claim 1, wherein the first material comprises: a linear optical material, a non-linear optical material, a III-V or III-VI alloy semiconductor material, a II-VI or II-VI alloy semiconductor material, a metal oxide, a silicon-containing material, or a single-crystal material.

8. The article of manufacture of claim 1, wherein the first material comprises diamond.

9. The article of manufacture of claim 1, wherein the first section has a width that is at least about 1% to 50% wider than a width of the second section of the strip.

10. The article of manufacture of claim 1, wherein the first section has a length that is at least about 10 times the width of the second section of the strip.

11. The article of manufacture of claim 1, wherein the strip of the photonic structure has a triangular cross-section.

12. The article of manufacture of claim 1, wherein the strip of the photonic structure is perforated with holes.

13. An apparatus comprising:
a waveguide connected to one or more support structures, including a first support structure supporting a first section of the waveguide having a width that is wider than a width of an adjacent second section of the waveguide and having a length that is at least about twice the width of the second section of the waveguide, the second section lacking a support structure, the waveguide providing adiabatic transfer of light between the first and second sections; and
at least one waveguide coupler configured to couple to a portion of the waveguide.

14. The apparatus of claim 13, wherein the first support structure is connected to a substrate.

15. The apparatus of claim 14, wherein the waveguide coupler is coupled to a portion of the waveguide that is suspended over the substrate.

16. The apparatus of claim 15, wherein the waveguide coupler surrounds the portion of the waveguide that is suspended over the substrate.

17. The apparatus of claim 15, wherein the portion of the waveguide that is suspended over the substrate is tapered within the waveguide coupler.

18. The apparatus of claim 14, wherein the waveguide, the first support structure, and the substrate are each composed of a first material.

19. The apparatus of claim 18, wherein the first material comprises: a linear optical material, a non-linear optical material, a III-V or III-VI alloy semiconductor material, a II-VI or II-VI alloy semiconductor material, a metal oxide, a silicon-containing material, or a single-crystal material.

20. The apparatus of claim 18, wherein the first material comprises diamond.

21. The apparatus of claim 18, wherein the waveguide coupler is composed of a second material different from the first material.

22. The apparatus of claim 21, wherein the second material has a lower refractive index than the first material.

23. The apparatus of claim 22, further comprising a third material, different from the first material and the second material, between the waveguide coupler and the substrate.

24. The apparatus of claim 23, wherein the third material has a lower refractive index than the second material.

25. The apparatus of claim 13, comprising at least two waveguide couplers, each coupled to a different portion of the waveguide.

26. The apparatus of claim 13, wherein the waveguide has a triangular cross-section.

27. The apparatus of claim 13, wherein the waveguide is perforated with holes.

28. The article of manufacture of claim 1, wherein the support structure that supports the first section of the strip is adjacent to at least a first gap between the substrate and a portion of the first section that is wider than the second section.

29. The article of manufacture of claim 28, wherein the first gap extends to a portion of the second section.

30. The apparatus of claim 13, wherein the first support structure that supports the first section of the waveguide is adjacent to at least a first gap between a layer of the apparatus and a portion of the first section that is wider than the second section.

31. The apparatus of claim 30, wherein the first gap extends to a portion of the second section.

32. A device comprising:
a substrate composed of a first material;
a waveguide composed of the first material and having a variable width; and
a plurality of support structures composed of the first material and extending between the substrate and the waveguide, each of the plurality of support structures supporting one of a plurality of supported sections of the waveguide, the plurality of supported sections of the waveguide being separated by a plurality of unsupported sections of the waveguide, wherein
each of the plurality of supported sections of the waveguide has a width greater than the widths of each of the plurality of unsupported sections,
each of the plurality of supported sections of the waveguide has a length that is greater than or equal to double the widths of each of the plurality of unsupported sections, and
the waveguide provides adiabatic transfer of light between the supported and unsupported sections.

33. The article of manufacture of claim 1, wherein the photonic structure forms an air-clad waveguide.

34. The article of manufacture of claim 1, wherein the photonic structure has an optical Q-factor of greater than 10,000.

35. The article of manufacture of claim 1, wherein the photonic structure has an optical Q-factor of greater than 100,000.

* * * * *